(12) United States Patent
Cheng

(10) Patent No.: US 10,172,382 B2
(45) Date of Patent: Jan. 8, 2019

(54) BEAN ROASTING DEVICE

(71) Applicant: Ching-Cheng Cheng, Taoyuan (TW)

(72) Inventor: Ching-Cheng Cheng, Taoyuan (TW)

( * ) Notice: Subject to any disclaimer, the term of this patent is extended or adjusted under 35 U.S.C. 154(b) by 648 days.

(21) Appl. No.: 14/823,515

(22) Filed: Aug. 11, 2015

(65) Prior Publication Data

US 2016/0044952 A1 Feb. 18, 2016

(30) Foreign Application Priority Data

Aug. 15, 2014 (TW) .............................. 103128082 A

(51) Int. Cl.
*A23B 4/03* (2006.01)
*A23N 12/12* (2006.01)
*A23N 12/10* (2006.01)
*F26B 3/28* (2006.01)
*F26B 3/30* (2006.01)

(52) U.S. Cl.
CPC ............ *A23N 12/125* (2013.01); *A23N 12/10* (2013.01); *F26B 3/283* (2013.01); *F26B 3/30* (2013.01)

(58) Field of Classification Search
CPC ....... A23N 12/10; A23N 12/125; F26B 3/283; F26B 3/30
USPC ....... 426/7, 44, 45, 443, 465, 466, 531, 590, 426/594, 595, 615, 629, 631, 665; 219/389, 410, 411, 413; 99/324, 331, 99/348, 352, 355, 467, 468, 473, 474, 99/476, 477, 478, 479, 483
See application file for complete search history.

(56) References Cited

U.S. PATENT DOCUMENTS 7,285,300 B1 * 10/2007 Allington ............... A23N 12/08
426/233
7,875,833 B2 * 1/2011 Song .................... A23N 12/125
219/389

* cited by examiner

*Primary Examiner* — Dana Ross
*Assistant Examiner* — Joseph Iskra
(74) *Attorney, Agent, or Firm* — Muncy, Geissler, Olds & Lowe, P.C.

(57) ABSTRACT

The present invention provides a bean roasting device, comprising: a drum unit comprising a base, a drum pivotally provided in the base and having a receiving space, and a rotation device provided on one side of the base and configured to drive the drum into rotation relative to the base; a heat lamp unit comprising a positioning seat connected to the base, one or a plurality of heat lamp tubes connected at one end to the positioning seat and extending into the receiving space, and one or a plurality of air inlet ducts each provided around a said heat lamp tube and configured to guide air into the receiving space of the drum; and an air supply/venting unit provided on one side of the base, the air supply/venting unit comprising an air guiding portion in communication with the receiving space of the drum and an air blower/air extractor provided on one side of the air guiding portion and configured to provide a positive pressure/negative pressure to the receiving space of the drum through the air guiding portion.

10 Claims, 7 Drawing Sheets

BEAN ROASTING DEVICE

BACKGROUND OF THE INVENTION

1. Technical Field

The invention relates to a bean roasting device, especially to a bean roasting device which combines infrared radiation and gas heating.

2. Description of Related Art

Coffee is nowadays one of the most popular beverages in the world, thanks to its reinvigorating, anti-depression, digestive, gall stone-preventing, and many other advantageous properties. Generally speaking, a cup of coffee is made by roasting coffee beans, grinding the roasted beans, and then brewing the ground coffee, in which process the bean roasting time, the roasting temperature, and the roasting technique are critical to the taste of the coffee made. As the bean roasting time and temperature are typically determined based on the operator's experience, efforts have been directed to improving the heating methods of bean roasters.

Commercially available bean roasters can be divided by the heat transfer mechanism into three major types: direct-flame, half direct-flame, and hot-air. In a direct-flame bean coaster, the coffee beans in the drum are heated directly by the flame such that the roasted beans tend to be partially charred or completely burned. In a half direct-flame bean roaster, i.e., a half hot-air bean roaster, there are no holes in the drum surface in contact with the flame; hot air is guided into the drum through tiny apertures in the lateral drum walls to complement thermal conduction via the metal drum so that the coffee beans in the drum can be roasted more evenly. A hot-air bean roaster blows high-temperature air to coffee beans and features highly effective heat transfer made possible by air convection; however, the need to heat a huge amount of air leads to considerable power consumption. Roasting by hot air is an energy-intensive process for achieving the desired bean quality.

Some of the conventional half direct-flame bean roasters use an infrared-based rather than flame-based heating device. Since the drum of such a roaster is heated only by infrared (or far infrared) radiation, and the coffee beans in the drum are not directly irradiated, the roasting temperature is lower and the heating process, longer, than when fire is used. The coffee industry, therefore, aims to improve this type of bean roasters structurally so as to increase their thermal efficiency and shorten their roasting time.

BRIEF SUMMARY OF THE INVENTION

In view of the above, it is an objective of the present invention to provide a bean roasting device which combines infrared radiation and gas heating to achieve high thermal efficiency.

To achieve the above mentioned goal, the present invention is to provide a bean roasting device, comprising: a drum unit comprising a base, a drum pivotally provided in the base and having a receiving space, and a rotation device provided on one side of the base and configured to drive the drum into rotation relative to the base; a heat lamp unit comprising a positioning seat connected to the base, one or a plurality of heat lamp tubes connected at one end to the positioning seat and extending into the receiving space, and one or a plurality of air inlet ducts each provided around a said heat lamp tube and configured to guide air into the receiving space of the drum; and an air supply/venting unit provided on one side of the base, the air supply/venting unit comprising an air guiding portion in communication with the receiving space of the drum and an air blower/air extractor provided on one side of the air guiding portion and configured to provide a positive pressure/negative pressure to the receiving space of the drum through the air guiding portion.

In a preferable embodiment, the drum unit comprises a feeding portion provided on one side of the base, and the feeding portion comprises a feeding duct in communication with the receiving space of the drum, a feeding port provided on one side of the feeding duct, and a feeding device provided on one side of the feeding duct and configured to open and close the feeding port.

In a preferable embodiment, the feeding device comprises a first baffle plate corresponding to the feeding port, a first rotating shaft provided on one side of the first baffle plate and configured to drive the first baffle plate into pivotal rotation, a first transmission device connected to the first rotating shaft and configured to drive the first rotating shaft into pivotal rotation in a first direction, and a first gravity handle connected to the first rotating shaft and configured to drive the first rotating shaft into pivotal rotation in a second direction; and the feeding device has a first state, in which the first baffle plate is opened with respect to the feeding port as a result of the first transmission device rotating the first rotating shaft and thus pivoting the first baffle plate in the first direction, and a second state, in which the first baffle plate is closed with respect to the feeding port as a result of the first gravity handle rotating the first rotating shaft and thus pivoting the first baffle plate in the second direction.

In a preferable embodiment, the drum unit comprises a discharge port provided on one side of the base and in communication with the receiving space of the drum, and a discharge device provided on one side of the base and configured to open and close the discharge port.

In a preferable embodiment, the discharge device comprises a second baffle plate corresponding to the discharge port, a second rotating shaft provided on one side of the second baffle plate and configured to drive the second baffle plate into pivotal rotation, a second transmission device connected to the second rotating shaft and configured to drive the second rotating shaft into pivotal rotation in a first direction, and a second gravity handle connected to the second rotating shaft and configured to drive the second rotating shaft into pivotal rotation in a second rotation; and the discharge device has a first state, in which the second baffle plate is opened with respect to the discharge port as a result of the second transmission device rotating the second rotating shaft and thus pivoting the second baffle plate in the first direction, and a second state, in which the second baffle plate is closed with respect to the discharge port as a result of the second gravity handle rotating the second rotating shaft and thus pivoting the second baffle plate in the second direction.

In a preferable embodiment, the heat lamp unit comprises one or a plurality of air inlet units each provided on one side of a said air inlet duct and configured to provide a positive pressure to the air inlet duct.

In a preferable embodiment, the heat lamp unit comprises one or a plurality of metal screens each provided in a said air inlet duct or corresponding to an end opening of the receiving space.

In a preferable embodiment, the drum comprises a rolling area formed within the receiving space and located on one side thereof which corresponds to a rotation direction of the rotation device, and the one or a plurality of heat lamp tubes are provided within the receiving space and located on an opposite side of the rolling area.

In a preferable embodiment, the one or a plurality of heat lamp tubes are one or a plurality of infrared lamps.

In a preferable embodiment, the air guiding portion comprises an air extraction port in communication with the receiving space of the drum and an air extraction duct connected to the air blower/air extractor and corresponding to the air extraction port.

Some embodiments of the present invention have the following technical advantages over the prior art:

1. According to the present invention, coffee beans are directly subjected to radiation from infrared lamps. As infrared radiation can reach the center of each coffee bean, coffee beans can be heated rapidly and evenly. That is to say, the time required for roasting can be shortened, and coffee beans can be sufficiently roasted in the center as well as on the outside.

2. The present invention includes a feeding device and a discharge device that enable automation.

3. The air inlet ducts in the present invention are air-cooled to prevent coffee beans in contact with the ducts from burning.

4. The heat source in the present invention is provided in a drum and is used to heat the interior of the drum exclusively, which saves energy.

DETAILED DESCRIPTION OF THE INVENTION

Figure 1:
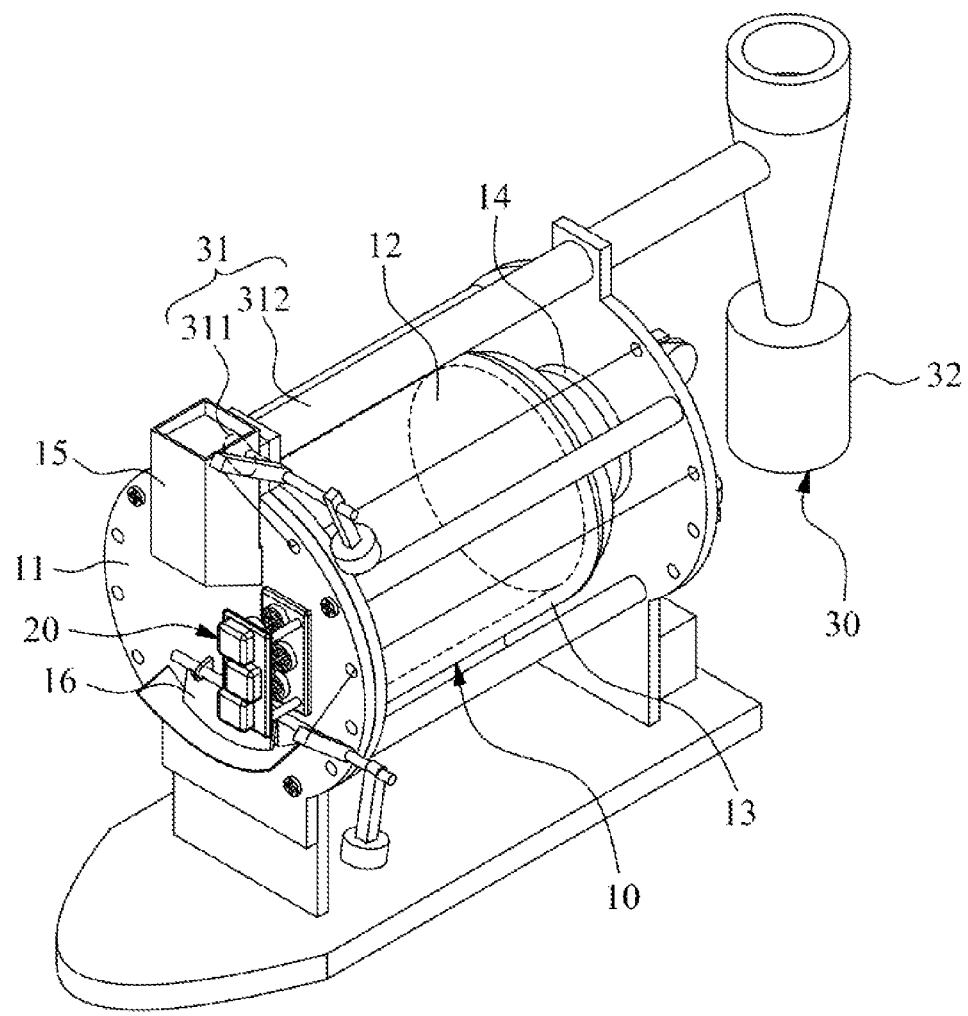
FIG. 1 is a schematic perspective view of the bean roasting device of the present invention.
Figure 2:
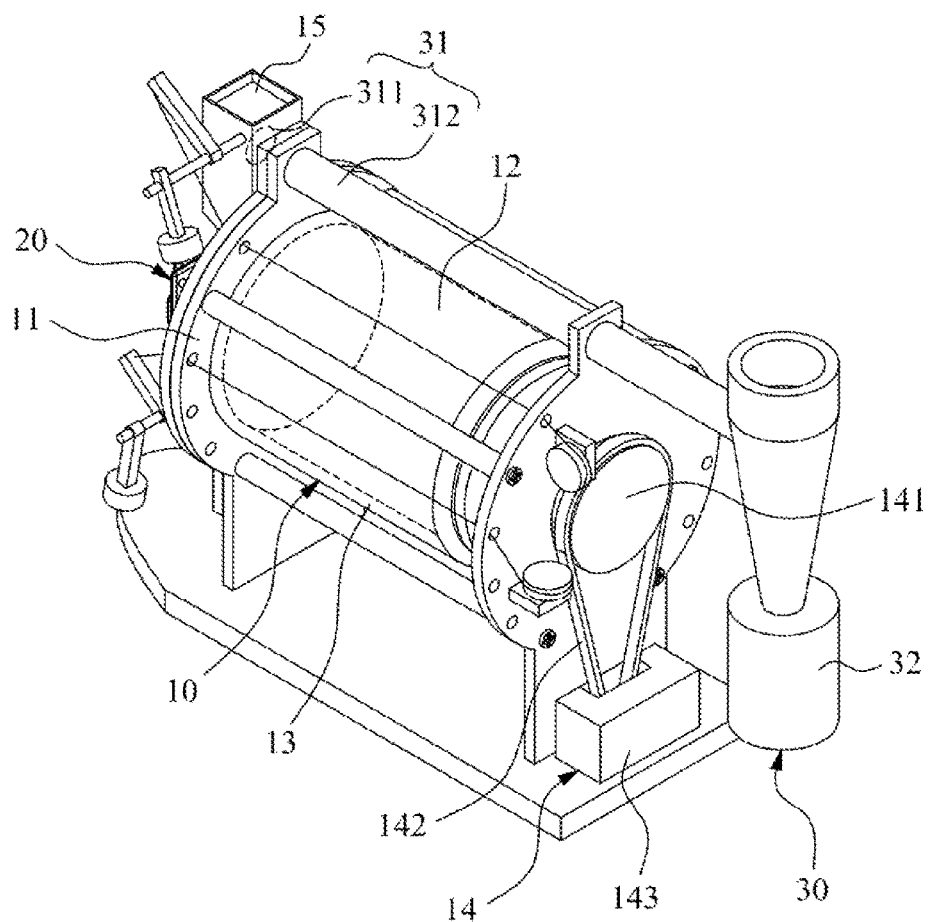
FIG. 2 is a schematic perspective view of the bean roasting device in FIG. 1, taken from another angle.

The structure of the bean roasting device of the present invention is described in further detail below. Please refer to FIG. 1 and FIG. 2 for two schematic perspective views of the bean roasting device of the present invention.

As shown in the drawings, the bean roasting device 100 of the present invention essentially includes a drum unit 10, a heat lamp unit 20 provided on one side of the drum unit 10, and a venting unit 30 connected to the drum unit 10. The drum unit 10 includes a base 11, a drum 13 pivotally provided in the base 11 and having a receiving space 12, a rotation device 14 provided on one side of the base 11 and configured to drive the drum 13 into rotation relative to the base 11, a feeding portion 15 provided on one side of the base 11, and a discharge portion 16 provided on one side of the base 11. Herein, the term "bean roasting device 100" refers a roasting device suitable for roasting not only coffee beans, but also other to-be-roasted materials such as grain, tea leaves, and the beans of various leguminous plants. In other words, all roasting devices which are based on the teachings of the present invention and are used for roasting fall within the scope of the present invention.

The rotation device 14 includes a rotating shaft 141 connected to one side of the drum 13, a belt pulley structure 142 connected to the rotating shaft 141 and configured to drive the rotating shaft 141 into rotation, and a motor 143 for driving the belt pulley structure 142 into operation. Aside from the belt pulley mechanism mentioned above, the rotation device 14 in the present invention may be a pulley mechanism, a gear mechanism, a friction wheel mechanism, or other mechanisms capable of rotating the drum 13. The present invention imposes no limitations on the type of the rotation device 14. In the illustrated embodiment, the rotation device 14 is connected to the rear side of the drum 13 and does not require additional bearings or connecting shafts at the front side of the drum 13. This arrangement allows the heat lamp unit 20 to be put into the drum 13 through the front side of the drum 13.

The venting unit 30 is provided on one side of the base 11 and includes an air guiding portion 31 in communication with the drum receiving space 12 and an air extractor 32 provided on one side of the air guiding portion 31 and configured to provide a negative pressure to the drum receiving space 12 through the air guiding portion 31. The air guiding portion 31 includes an air extraction port 311 in communication with the drum receiving space 12 and an air extraction duct 312 connected to the air extractor 32 and corresponding to the air extraction port 311.

Figure 3:
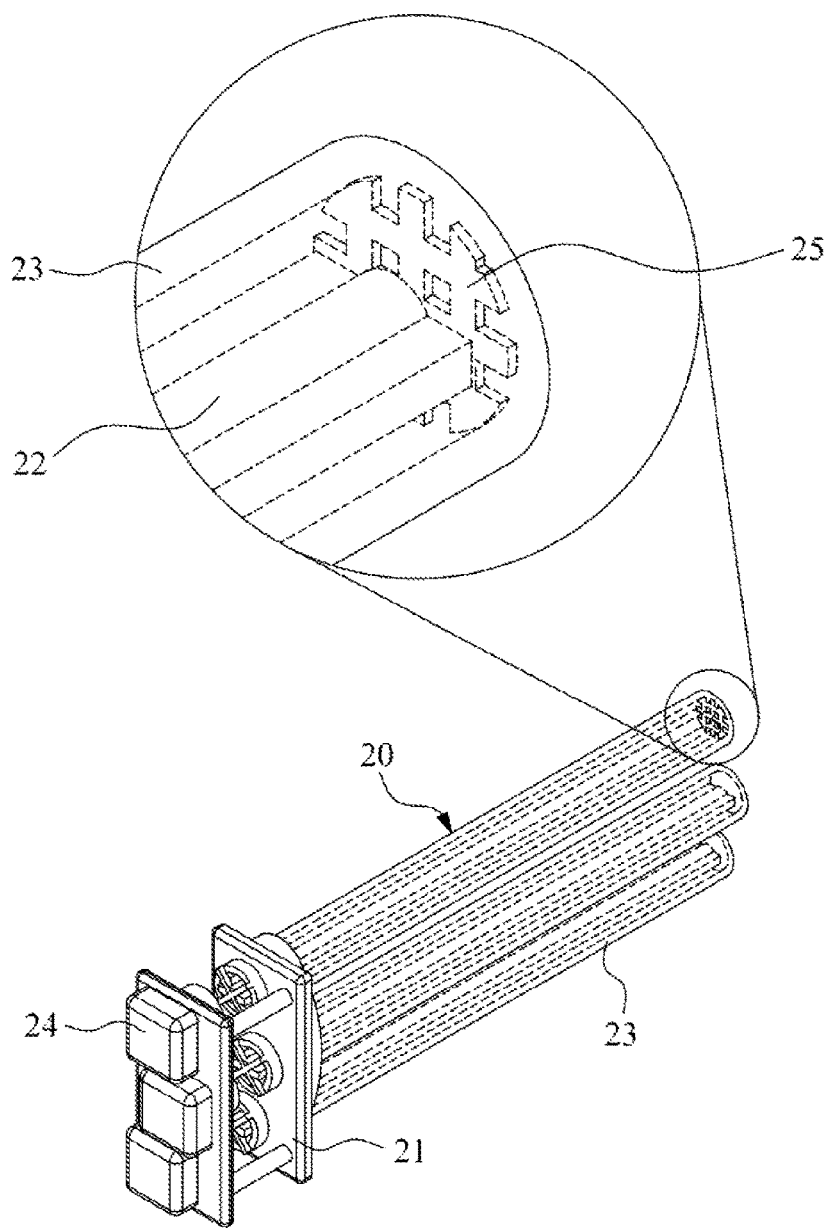
FIG. 3 schematically shows the heat lamp unit of the bean roasting device of the present invention.

Please refer to FIG. 3 for a schematic drawing of the heat lamp unit of the bean roasting device of the present invention.

As shown in FIG. 3, the heat lamp unit 20 includes a positioning seat 21 connected to the base 11, one or a plurality of heat lamp tubes 22 connected at one end to the positioning seat 21 and extending into the receiving space 12, one or a plurality of air inlet ducts 23 each provided around one heat lamp tube 22 and configured to guide air into the drum receiving space 12, one or a plurality of air inlet units 24 each provided on one side of one air inlet duct 23 and configured to provide a positive pressure to the air inlet duct 23, and one or a plurality of metal screens 25 each provided in one air inlet duct 23 or corresponding to an end opening of the drum receiving space 12. The heat lamp tubes 22 can be, for example, infrared lamps, far infrared ceramic heating plates, or other infrared-based heating devices. The present invention imposes no limitations on the type of the heat lamp tubes 22. The air inlet ducts 23 in the present invention serve to protect the heat lamp tubes 22 therein. Moreover, the air inlet ducts 23 provide air ventilation that helps dissipate heat from the heat lamp tubes 22, for when the heat lamp tubes 22 are in operation, the temperature of the tungsten filaments in the tubes can reach several thousand degrees and the temperature of the heat lamp tubes 22 themselves can reach six to seven hundred degrees. In addition, the air inlet ducts 23 isolate the heat lamp tubes 22 from the material being roasted and thereby protect the material from contact with and being charred by the heat lamp tubes 22. The air inlet ducts 23 can be made of heat-resistant glass or quartz, without limitation. The metal screens 25 in the present invention keep the material being roasted from entering the heat lamp unit 20. The heat lamp unit 20 in the present invention may be additionally provided with a vibrating motor (not shown) to remove, by vibration, any roasted material that stands on the heat lamp unit 20.

Figure 4:
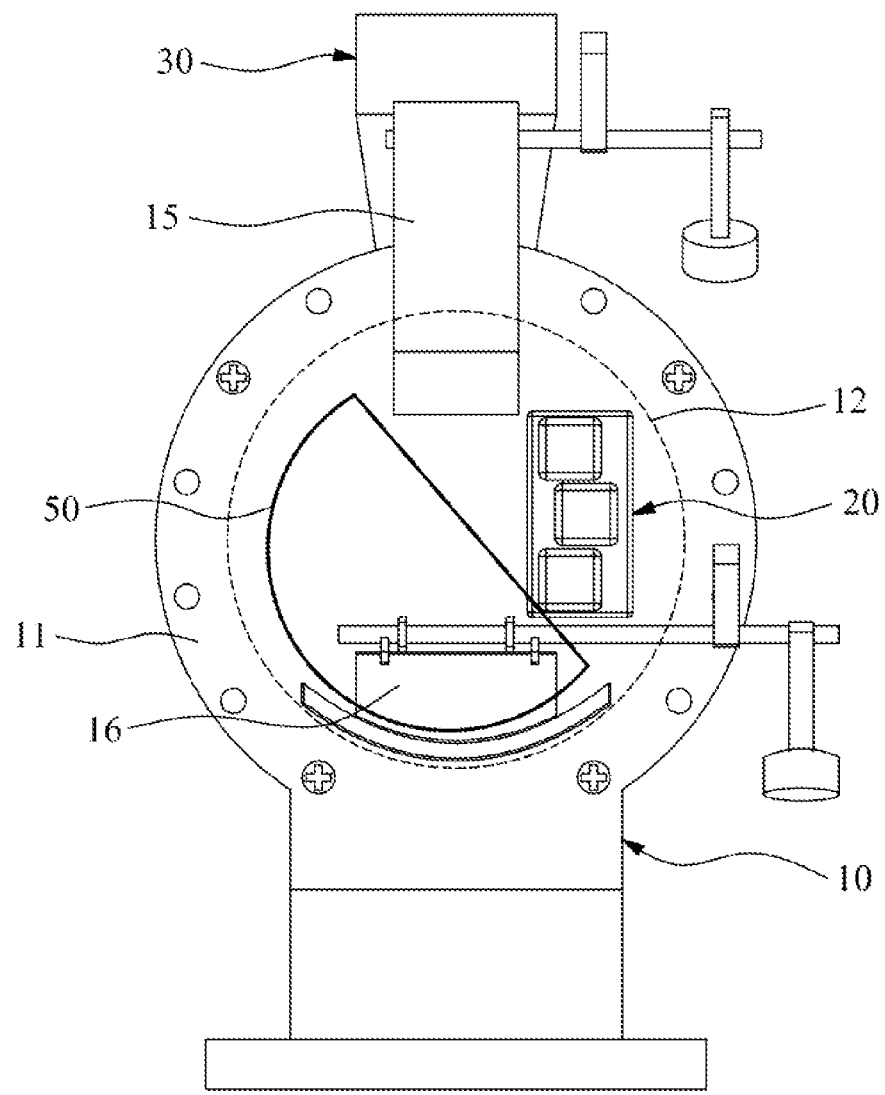
FIG. 4 schematically shows the rolling area in the bean roasting device of the present invention.

FIG. 4 schematically shows the rolling area in the bean roasting device of the present invention.

As shown in FIG. 4, the drum 13 includes a rolling area 50 formed within the drum receiving space 12 and located on one side of the drum receiving space 12 that corresponds to the rotation direction of the rotation device 14. The heat lamp tubes 22 are provided within the drum receiving space 12 and located on the opposite side of the rolling area 50. The heat lamp tubes 22 in FIG. 4 are provided in an upper lateral corner of the drum receiving space 12 (e.g., an upper right or upper left corner of the receiving space 12) rather than at the center of the receiving space so that there is ample space (i.e., the rolling area 50) in which the material being roasted can be rolled.

Figure 5A:
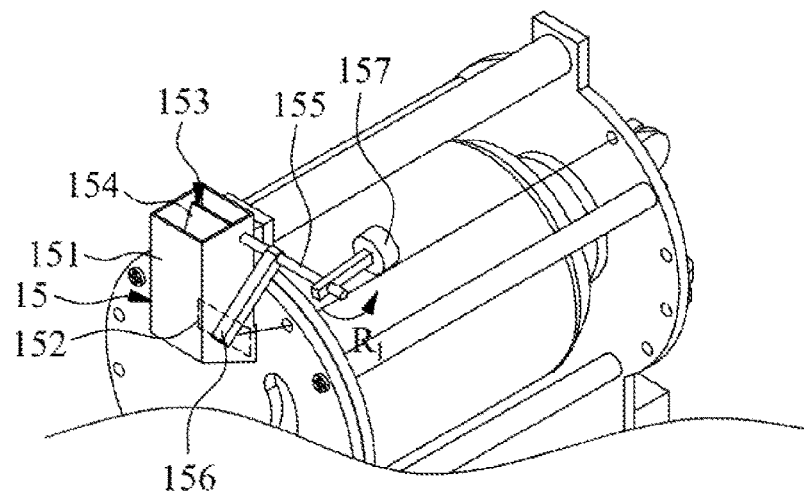
FIG. 5(a) and FIG. 5(b) schematically and respectively show a first and a second state of the feeding device in the present invention.
Figure 5B:
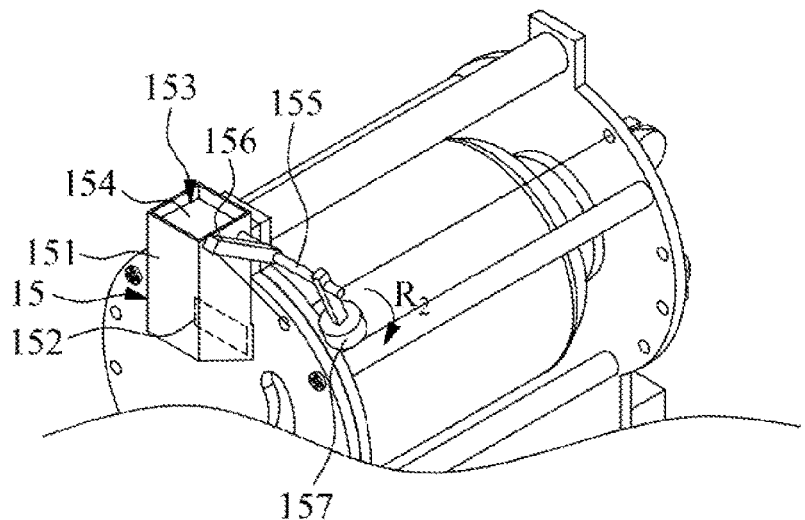

FIG. 5(a) and FIG. 5(b) schematically and respectively show a first and a second state of the feeding device in the present invention.

As shown in FIG. 5(a) and FIG. 5(b), the feeding portion 15 includes a feeding duct 151 in communication with the drum receiving space 12, a feeding port 152 provided on one side of the feeding duct 151, and a feeding device 153 provided on one side of the feeding duct 151 and configured to open and close the feeding port 152. The feeding device 153 includes a first baffle plate 154 corresponding to the feeding port 152, a first rotating shaft 155 provided on one side of the first baffle plate 154 and configured to drive the first baffle plate 154 into pivotal rotation, a first transmission device 156 connected to the first rotating shaft 155 and configured to drive the first rotating shaft 155 into pivotal rotation in a first direction $R_1$, and a first gravity handle 157 connected to the first rotating shaft 155 and configured to drive the first rotating shaft 155 into pivotal rotation in a second direction $R_2$. The first baffle plate 154 can automatically closed by gravity or be opened and closed via the first transmission device 156. The first transmission device 156 can be, for example, a pulley mechanism, a gear mechanism, a friction wheel mechanism, or other mechanisms capable of rotating the first rotating shaft 155. The present invention imposes no limitations on the type of the first transmission device 156.

The feeding device 153 has a first state, in which the first baffle plate 154 is opened with respect to the feeding port 152 as a result of the first transmission device 156 rotating the first rotating shaft 155 and thus pivoting the first baffle plate 154 in the first direction $R_1$. The feeding device 153 also has a second state, in which the first baffle plate 154 is closed with respect to the feeding port 152 as a result of the first gravity handle 157 rotating the first rotating shaft 155 and thus pivoting the first baffle plate 154 in the second direction $R_2$.

Figure 6A:
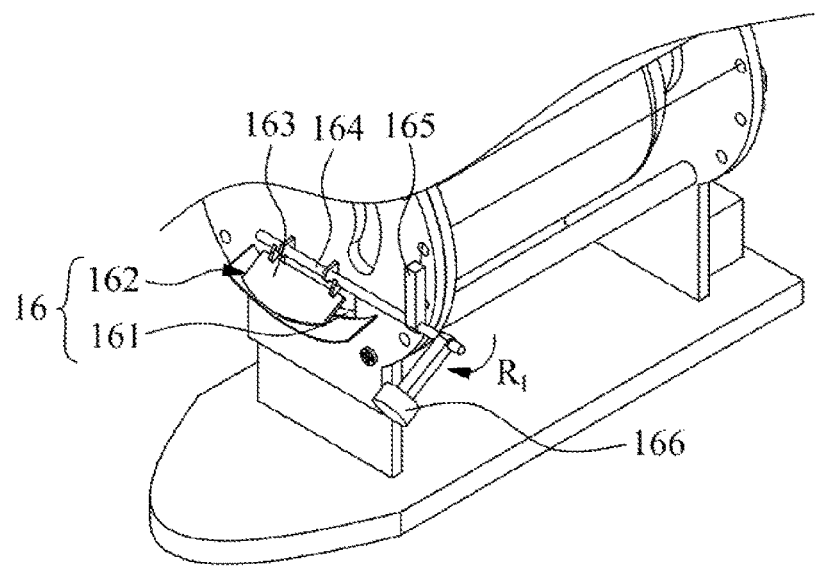
FIG. 6(a) and FIG. 6(b) schematically and respectively show a first and a second state of the discharge device in the present invention.
Figure 6B:
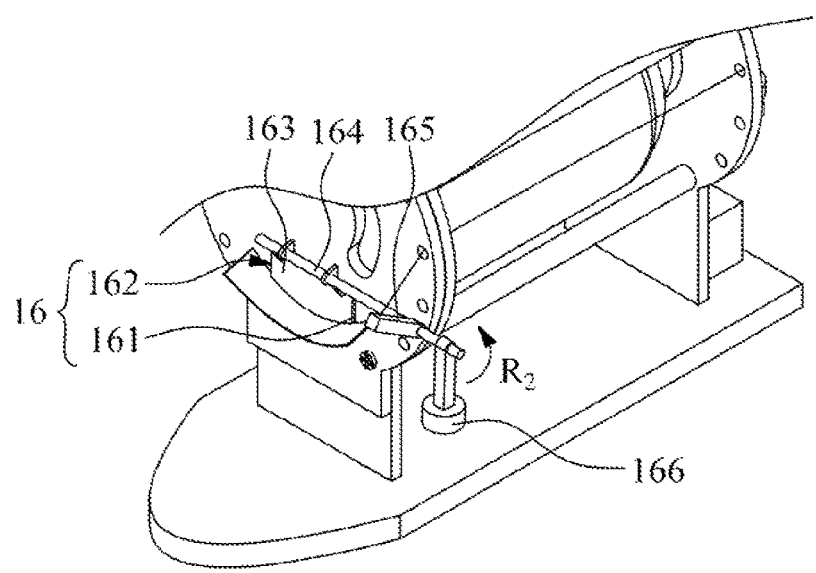

FIG. 6(a) and FIG. 6(b) schematically and respectively show a first and a second state of the discharge device in the present invention.

As shown in FIG. 6(a) and FIG. 6(b), the discharge portion 16 includes a discharge port 161 provided on one side of the base 11 and in communication with the drum receiving space 12, and a discharge device 162 provided on one side of the base 11 and configured to open and close the discharge port 161. The discharge device 162 includes a second baffle plate 163 corresponding to the discharge port 161, a second rotating shaft 164 provided on one side of the second baffle plate 163 and configured to drive the second baffle plate 163 into pivotal rotation, a second transmission device 165 connected to the second rotating shaft 164 and configured to drive the second rotating shaft 164 into pivotal rotation in a first direction $R_1$, and a second gravity handle 166 connected to the second rotating shaft 164 and configured to drive the second rotating shaft 164 into pivotal rotation in a second rotation $R_2$. The second baffle plate 163 can be automatically closed by gravity or be opened and closed via the second transmission device 165. The second transmission device 165 can be, for example, a pulley mechanism, a gear mechanism, a friction wheel mechanism, or other mechanisms capable of rotating the second rotating shaft 164. The present invention imposes no limitations on the type of the second transmission device 165.

The discharge device 162 has a first state, in which the second baffle plate 163 is opened with respect to the discharge port 161 as a result of the second transmission device 165 rotating the second rotating shaft 164 and thus pivoting the second baffle plate 163 in the first direction $R_1$. The discharge device 162 also has a second state, in which the second baffle plate 163 is closed with respect to the discharge port 161 as a result of the second gravity handle 166 rotating the second rotating shaft 164 and thus pivoting the second baffle plate 163 in the second direction $R_2$.

The feeding device 153 and the discharge device 162 are not limited to the foregoing structures; they can be structurally modified by a person of ordinary skill in the art according to the desired functions and configurations.

Figure 7:
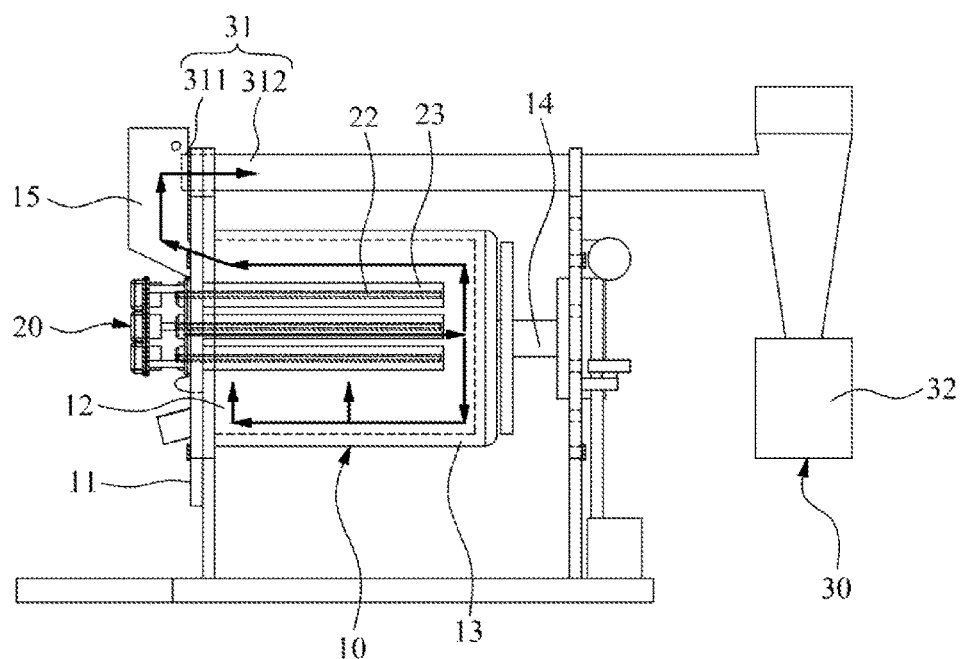
FIG. 7 schematically shows air flows inside the bean roasting device of the present invention.

FIG. 7 schematically shows the internal air flows of the bean roasting device of the present invention.

As shown in FIG. 7, which depicts a preferred embodiment of the present invention, ambient air is guided into the air inlet ducts 23 by the air inlet units 24 and then heated by the heat lamp tubes 22 such that the temperature of the air rises rapidly. The heated air flows into the drum receiving space 12 and is discharged from the bean roasting device 100 by the venting unit.

According to the above, the bean roasting device of the present invention is so designed that air flows through the air inlet ducts, which are an open space, into the drum receiving space due to the negative pressure generated in the drum receiving space by the air extractor and is heated by the heat lamp tubes in the air inlet ducts. The coffee beans in the drum are therefore heated by both hot air and radiant heat to save energy. Moreover, ventilation provided by the air extractor helps lower the temperature of the heat lamp tubes so that the material being roasted will not char when in contact with the air inlet ducts.

To compare the performance of the bean roasting device of the present invention with those of the commercially available direct-flame bean roasters, half direct-flame bean roasters, and hot-air beans roasters, the inventor conducted a series of experiments, whose results are shown in Table 1 below. It is found that the infrared bean roaster of the present invention advantageously features a shorter roasting time, higher roast uniformity without burning, and higher thermal efficiency of roast than the direct-flame bean roasters and the half direct-flame bean roasters, and a shorter roasting time, higher thermal efficiency of roast, and larger roast capacity than the hot-air bean roasters.

TABLE 1

|  | Roasting time | Roast uniformity | Thermal efficiency of roast | Roast capacity | Roaster price for the same capacity |
| --- | --- | --- | --- | --- | --- |
| Direct-flame bean roasters | Medium (12~20 min.) | Average | Average | Large | Low |
| Half direct-flame bean roasters | Long (15~30 min.) | Average | Average | Large | Medium |

TABLE 1-continued

| | Roasting time | Roast uniformity | Thermal efficiency of roast | Roast capacity | Roaster price for the same capacity |
|---|---|---|---|---|---|
| Hot-air bean roasters | Short (9~11 min.) | Good | Poor | Small | Very high |
| Bean roaster of the present invention | Very short (6~7 min.) | Good | Excellent | Large | Low |

While the present invention has been elaborated by exemplifying certain preferred embodiments, it is not to be limited to the disclosed embodiments. On the contrary, it is intended to cover various modifications and equivalent arrangements included within the spirit and scope of the appended claims and equivalents thereof.

What is claimed is:

1. A bean roasting device, comprising:
   a drum unit comprising a base, a drum pivotally provided in the base and having a receiving space, and a rotation device provided on one side of the base and configured to drive the drum into rotation relative to the base;
   a heat lamp unit comprising a positioning seat connected to the base, one or a plurality of heat lamp tubes connected at one end to the positioning seat and extending into the receiving space, and one or a plurality of air inlet ducts inserted into the receiving space to contain said heat lamp tubes inside individually to separate the heat lamp tube and beans inside the receiving space and configured to guide air into the receiving space of the drum; and
   an air supply/venting unit provided on one side of the base, the air supply/venting unit comprising an air guiding portion in communication with the receiving space of the drum and an air blower/air extractor provided on one side of the air guiding portion and configured to provide a positive pressure/negative pressure to the receiving space of the drum through the air guiding portion.

2. The bean roasting device of claim 1, wherein the drum unit comprises a feeding portion provided on the base, and the feeding portion comprises a feeding duct in communication with the receiving space of the drum, a feeding port provided on one side of the feeding duct, and a feeding device provided on the feeding duct and configured to open and close the feeding port.

3. The bean roasting device of claim 2, wherein the feeding device comprises a first baffle plate corresponding to the feeding port, a first rotating shaft provided on one side of the first baffle plate and configured to drive the first baffle plate into pivotal rotation, a first transmission device connected to the first rotating shaft and configured to drive the first rotating shaft into pivotal rotation in a first direction, and a first gravity handle connected to the first rotating shaft and configured to drive the first rotating shaft into pivotal rotation in a second direction; and the feeding device has a first state, in which the first baffle plate is opened with respect to the feeding port as a result of the first transmission device rotating the first rotating shaft and thus pivoting the first baffle plate in the first direction, and a second state, in which the first baffle plate is closed with respect to the feeding port as a result of the first gravity handle rotating the first rotating shaft and thus pivoting the first baffle plate in the second direction.

4. The bean roasting device of claim 1, wherein the drum unit comprises a discharge port provided on the base and in communication with the receiving space of the drum, and a discharge device provided on the base and configured to open and close the discharge port.

5. The bean roasting device of claim 4, wherein the discharge device comprises a second baffle plate corresponding to the discharge port, a second rotating shaft provided on one side of the second baffle plate and configured to drive the second baffle plate into pivotal rotation, a second transmission device connected to the second rotating shaft and configured to drive the second rotating shaft into pivotal rotation in a first direction, and a second gravity handle connected to the second rotating shaft and configured to drive the second rotating shaft into pivotal rotation in a second rotation; and the discharge device has a first state, in which the second baffle plate is opened with respect to the discharge port as a result of the second transmission device rotating the second rotating shaft and thus pivoting the second baffle plate in the first direction, and a second state, in which the second baffle plate is closed with respect to the discharge port as a result of the second gravity handle rotating the second rotating shaft and thus pivoting the second baffle plate in the second direction.

6. The bean roasting device of claim 1, wherein the heat lamp unit comprises one or a plurality of air inlet units each provided on one side of a-said air inlet duct and configured to provide a positive pressure to the air inlet duct.

7. The bean roasting device of claim 1, wherein the heat lamp unit comprises one or a plurality of metal screens each provided in said air inlet duct or corresponding to an end opening of the receiving space.

8. The bean roasting device of claim 1, wherein the drum comprises a rolling area formed within the receiving space which corresponds to a rotation direction of the rotation device, and the one or a plurality of heat lamp tubes are provided within the receiving space and located on an opposite side of the rolling area.

9. The bean roasting device of claim 1, wherein the one or a plurality of heat lamp tubes are one or a plurality of infrared lamps.

10. The bean roasting device of claim 1, wherein the air guiding portion comprises an air extraction port in communication with the receiving space of the drum and an air extraction duct connected to the air blower/air extractor and circulate to the air extraction port.

* * * * *